Nov. 28, 1967   H. K. GLEASMAN   3,354,750

TWO SPEED HUB GEARING FOR VELOCIPEDES

Filed Aug. 27, 1965

WITNESS:
Esther M. Stockton

INVENTOR.
Hollis K. Gleasman
BY
W. S. Thompson
ATTORNEY

Patented Nov. 28, 1967

3,354,750
TWO SPEED HUB GEARING FOR VELOCIPEDES
Hollis K. Gleasman, Elmira, N.Y., assignor to The Bendix Corporation, a corporation of Delaware
Filed Aug. 27, 1965, Ser. No. 483,082
7 Claims. (Cl. 74—750)

ABSTRACT OF THE DISCLOSURE

A two-speed hub gearing arrangement for bicycles having a pair of shafts driven at different speeds through a common planetary gear drive arrangement. Each drive shaft has a clutch, high speed and low speed drive, operative to selectively drive a hub and, hence, wheels. The lower speed clutch is threadedly connected to one shaft and the high speed clutch is connected via straight splines to the other shaft. Indexing means responsive to backward or reverse motion of the drive alternately permits one or the other of the clutches to become the driving clutch and is located intermediate the clutch members. The arrangement provides lower frictional force opposing forward drive and eliminates one threaded shaft in clutch connection common to prior art devices.

---

It is an object of the present invention to provide a novel two-speed hub of the above type which is efficient and reliable in operation and of being simple and economical in construction.

It is an object of the present invention to provide a novel two-speed hub of the above type in which frictional losses are greatly reduced, especially in high speed drive.

It is another object of the present invention to provide a two-speed hub of the above type which prevents driving in two positions or two modes at the same time.

It is another object of the present invention to provide a device in which the axial or side thrust forces are significantly decreased during high speed operation.

Further objects and advantages will be apparent from the following description taken in connection with the accompanying drawing in which.

Figure 1:
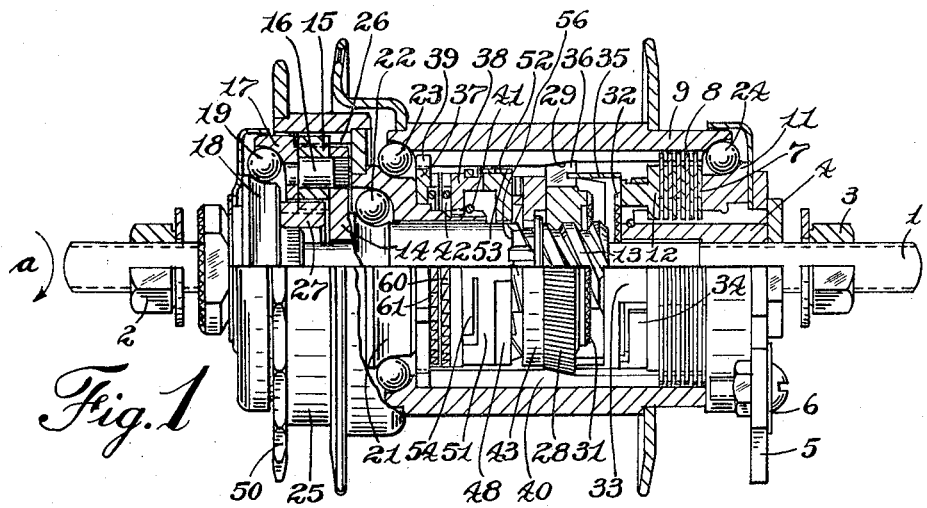
FIGURE 1 is a side elevation, partly broken away and in section, of a preferred embodiment of the invention.

FIGURE 1 of the drawing illustrates the stationary axle 1 adapted to be mounted to the rear fork of a bicycle by means of clamp nuts 2 and 3. A brake anchor sleeve 4 is adjustably mounted on the axle 1 prevented from rotation by anchor arm 5, adapted to be attached to the frame of the bicycle by means of a clip 6 in the usual manner.

A plurality of brake discs 7 are splined on the anchor sleeve 4 and arranged to cooperate with a second set of brake discs 8 splined to the interior of the wheel hub 9. Brake discs are arranged to be compressed between an abutment ring 11 fixed on the anchor sleeve 4 and a thrust ring 12 splined on said sleeve. Those skilled in the art will readily appreciate that a shoe-type brake could have been incorporated in the hub design. An example of such a shoe-type brake is that disclosed in application Ser. No. 453,717, filed on May 6, 1965 by Edwin Elliott Hood and assigned to the assignee of the present application.

A first threaded shaft 13 or low speed screwshaft is journalled on the axle 1 and has fixedly mounted thereon a planet carrier ring 14 in which a plurality of planet pinions 15 are rotatably mounted as by means of pintles 16. The outer ends of the pintles are seated in a bearing hub 17 which is rotatably mounted on a fixed bearing cone 18 by means of bearings 19. A second shaft 21 or high speed shaft is rotatably mounted on the low speed or first threaded shaft by means of bearings 22. It in turn supports the adjacent end of hub 9 by means of bearings 23. The opposite end of the hub 9 is supported by bearings 24 on the abutment ring 11.

A driving member 25 mounted on or formed integrally with the high speed or first threaded shaft 21 has an internal orbit gear 26 meshing with the planet pinions 15 and a stationary sun gear 27 fixed on or formed integrally with the bearing cone 18, also meshing with the planet pinions 15.

A first driving clutch member 28 is threaded on the first shaft 13 for movement into clutching engagement with an interior conical clutch surface 29 of the hub 9 by forward rotation of the first threaded shaft. Backward rotation of the first threaded shaft 13 is arranged to cause the first driving clutch member 28 to traverse the shaft 13 into engagement with the thrust ring 12, thus compressing the brake discs 7 and 8 to apply the brake. The adjacent surfaces of the low speed or first driving clutch member 28 and thrust ring 12 are provided with teeth 31 and 32 respectively which engage during the braking operation. A retarder sleeve 33 is formed by having a spring arm 34 bearing frictionally on the thrust ring 12 with a finger 35 extending into an axial slot 36 in the first driving clutch member 28, thereby frictionally retarding rotation of said clutch member to insure its translation responsive to rotation of the first threaded shaft 13.

A second driving clutch member 38 is slidably splined on the second shaft member 21 for movement into and out of engagement with a driving ring member 37 which has splines 39 adapted to engage axiallly-extending splines 40 formed in the hub 9. A split ring 41 limits the movement of the second driving clutch member 38 toward the first driving clutch member 28. A coil spring 42 is compressively confined between the second driving clutch member 38 and the driving ring member 37. Those skilled in the art will readily appreciate that while in the embodiment shown, driving ring 37 is a direct drive of the hub 9 and clutch member 28 is an under drive of the hub 9, that these configurations may be readily changed, for example, to an overdrive and direct drive arrangement. A first annular toothed member or toothed abutment ring 43 is splined on the first threaded shaft member. It is provided with laterally-extending teeth 44 and 45 (FIGURE 2) adapted to mesh between similarly-formed teeth 46 and 47 on a cooperating second toothed member or abutment ring 48. Ring 48 is slidably and rotatably journalled on the second shaft member 21. The spring member 42 urges the second annular toothed member 48 into engagement with the first annular toothed member 43. The first toothed abutment ring 43 is splined to the first threaded shaft member 13 and axially movable on the splines formed thereon. A frictional retarder ring 51 interconnects the second driving clutch member 38 and the second annular toothed members 48 respectively. A retarder ring 51 has a finger 52 slidably received in a slot 53 in the second annular toothed member 48 and a spring arm 54 bearing frictionally on the exterior surface of the second driving clutch member 38. Those skilled in the art will recognize that the retarder member 51 (as well as retarder member 33) could be replaced by the retarder spring and coupling member combination shown in U.S. Patent 2,982,384, issued to Edwin Elliott Hood and assigned to the assignee of the present application.

Figure 2:
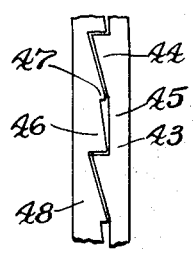
FIGURE 2 is an enlarged detailed portion of the tooth abutment rings controlling the engagement of the driving clutches, the rings being shown in their fully-meshed relationship.
Figure 3:
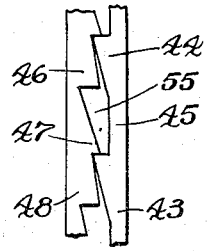
FIGURE 3 is a view similar to FIGURE 2 showing the tooth rings in their spaced or greater axial dimension.

As shown in FIGURES 2 and 3, teeth 44 and 45 of ring 43 are of saw-tooth or buttress configuration, these teeth being unequal in height. The teeth 46 and 47 on rings 48 are similarly formed. When, therefore, the high teeth 47 of ring 48 engage the low teeth 44 of ring 43, the low teeth 46 of ring 48 engage the high teeth 45 of ring 43. The teeth are meshed together completely as shown in FIGURE 2. In this fully meshed position the rings 43 and 48 are at their minimum axial dimension. When the ring 48 has been indexed one tooth with respect to the ring 43 so that the high teeth 47 of the ring 48 will engage the high teeth 45 of ring 43. The rings 43 and 48 are separated by a space 55, as shown in FIGURE 3. In this position the rings 43 and 48 are at their maximum axial dimension.

The thickness of the rings 43 and 48 is such that when the rings are fully meshed as in FIGURES 1 and 2, the first driving clutch member 28 is permitted to travel to the left in FIGURE 1 into operative engagement with the interior clutch surface 29 of the hub 9. When the rings 43 and 48 are spaced apart as shown in FIGURE 3, the second driving clutch member 38 is engaged with the driving ring member 37 by means of a complementary dentil teeth 60 and 61 formed thereon respectively. The annular ring 43 serves to block the lateral movement of the first driving clutch member 28 and to keep it from engaging the clutch surface 29 of the hub 9. A shoulder 56 formed on the first threaded shaft limits the lateral movement of the first ring 43 and thereby minimizes frictional losses between the second ring 48 and the second driving clutch member 38.

In operation, the starting parts are in the first driving gear or low speed relation as shown in FIGURE 1. Rotation of the driving member 25 in the direction of the arrow a, forward, by means of the sprocket 50 will cause the first driving clutch member 28 to engage the clutch surface 29 and rotate the hub 9. When it is desired to operate in the second gear, the operator back pedals slightly, thus rotating the first threaded shaft member 13 backward. Since backward rotation of the first driving clutch member 28 is resisted by the drag or retarder member 33, this backward rotation of the first threaded shaft backs the first driving clutch member away from engagement with the hub. Since the abutment ring 48 is frictionally connected to the second driving clutch member by the retarder 51, said ring is also rotated in a backward direction. The abutment ring 43, being splined on the first threaded shaft, will be thus indexed backward one tooth relative to the abutment ring 48 where its high teeth 45 engage the high teeth 47 of ring 48.

On subsequent forward rotation of the driving member 25, the ring 48 is positively rotated with the ring 43 by the engagement of their buttress teeth while the low speed or first driving clutch member 28 is prevented by the ring 43 from engaging the hub 9. The frictional connection by retarder member 51 between the second driving clutch member and the second annular ring member 48 permits the rings 43 and 48 to rotate at the same rate. The hub is now being driven by the second driving clutch member 38 to the driving ring member 37 which is splined to the hub 9. Shifting back into the first driving clutch member driving the hub 9 is accomplished by backward rotation of the driving member 25 in the usual manner. Backward rotation of the driving member 25 more than necessary to accomplish indexing is sufficient to apply the brake in the usual manner.

Although certain structure has been shown and described in detail, it will be understood that changes may be made in the design and arrangement of the parts without departing from the spirit of the invention.

Those skilled in the art will readily appreciate that toothed rings 43 and 48 may be dimensioned to either index one or two teeth (or multiples thereof) upon forward rotation of the sprocket member 50 following braking. It is a matter of design choice whether, following braking, the hub is driven in the same or different drive ratio as it was prior to braking.

I claim:
1. In a two-speed hub for velocipedes and the like the combination of:
   a fixed axle;
   a first threaded shaft member journalled thereon;
   a second shaft member journalled on the threaded shaft member;
   a driving means for rotating the first threaded shaft member and the second shaft member at different speeds;
   a first driving clutch member threadedly received on the first threaded shaft member;
   a second driving clutch member slidably journalled on the second shaft member;
   said hub having a clutch surface and axially-extending splines formed thereon;
   a driving ring member having splines engaging the hub axially-extending splines;
   shifting means for moving the first and second driving clutch members selectively into engagement with the hub clutch surface and the driving ring member respectively;
   said shifting means including a first annular toothed member slidably and non-rotatably mounted on the first threaded shaft member;
   a second annular toothed member slidably journalled on the second shaft member;
   said first and second toothed members each having alternate teeth of unequal height such that said toothed members have a variable two step axial width;
   said first driving clutch member operative to drive the hub when said annular toothed members are fully meshed and said second driving clutch member is operative to drive the hub when said annular toothed members are mismatched; and
   means for indexing the second toothed member with respect to the first toothed member to bring its high teeth into and out of engagement with the high teeth of the second toothed member.

2. The device as set forth in claim 1 in which the means for indexing the second toothed ring includes a frictional retarding connection between the second toothed ring and the second driving clutch member.

3. The device described in claim 1 wherein a coil spring member is compressively confined between the second driving clutch member and the driving ring member.

4. The device described in claim 1 including further complementing dentil teeth formed on the secondary driving clutch member and the driving ring member.

5. In a two-speed hub for velocipedes and the like the combination of:
   a fixed axle;
   a first threaded shaft member mounted coaxially with the axle;
   a second shaft member mounted coaxially with the axle;
   a driving means for rotating the first and second shaft members at different speeds;
   a first driving clutch member threadedly received on the first threaded shaft member;
   a second driving clutch member slidably journalled on the second shaft member;
   driven means in the hub adapted to be selectively driven by the first and second driving clutch members;
   shifting means for selectively driving the hub through said first and second driving clutch member having first and second toothed members, each toothed member having alternate teeth of unequal height such that said toothed members have a variable two position axial extent; and means for indexing the second toothed members with respect to the first toothed members to bring its high teeth into and out of engagement with the high teeth of the second toothed member.

6. The device described in claim 5 wherein:

the first toothed ring is slidably and non-rotatably received on the first shaft member; and the second toothed ring is slidably journalled on the second shaft member.

7. The device described in claim 6 wherein:

the indexing means comprises a frictional retarder for causing relative rotation between the first and second toothed ring members.

References Cited

UNITED STATES PATENTS

| | | | |
|---|---|---|---|
| 766,277 | 8/1904 | Maynes | 74—750 |
| 2,953,945 | 9/1960 | Gleasman | 74—750 |
| 3,186,259 | 6/1965 | La Brie | 74—750 |
| 3,200,669 | 8/1965 | Schwerdhofer | 74—750 |
| 3,215,002 | 11/1965 | Schwerdhofer | 74—750 |

DONLEY J. STOCKING, *Primary Examiner.*

J. R. BENEFIEL, *Assistant Examiner.*